(12) United States Patent
Kwant et al.

(10) Patent No.: US 10,402,995 B2
(45) Date of Patent: Sep. 3, 2019

(54) METHOD, APPARATUS, AND SYSTEM FOR REAL-TIME OBJECT DETECTION USING A CURSOR RECURRENT NEURAL NETWORK

(71) Applicant: HERE GLOBAL B.V., Eindhoven (NL)

(72) Inventors: Richard Kwant, Oakland, CA (US); Anish Mittal, Berkeley, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 191 days.

(21) Appl. No.: 15/661,929

(22) Filed: Jul. 27, 2017

(65) Prior Publication Data
US 2019/0035101 A1   Jan. 31, 2019

(51) Int. Cl.
| G06K 9/00 | (2006.01) |
| G06T 7/60 | (2017.01) |
| G06N 3/08 | (2006.01) |
| G06N 3/04 | (2006.01) |

(52) U.S. Cl.
CPC .......... G06T 7/60 (2013.01); G06N 3/0445 (2013.01); G06N 3/08 (2013.01); G06T 2207/20081 (2013.01); G06T 2207/20084 (2013.01)

(58) Field of Classification Search
None
See application file for complete search history.

(56) References Cited

U.S. PATENT DOCUMENTS

| 6,819,790 | B2 | 11/2004 | Suzuki et al. |
| 2016/0086053 | A1* | 3/2016 | Zhu .................... G06K 9/6244 382/197 |
| 2016/0328645 | A1 | 11/2016 | Lin et al. |

FOREIGN PATENT DOCUMENTS

WO     2016156236 A1    10/2016

OTHER PUBLICATIONS

Morton et al., "Deep Learning of Spatial and Temporal Features for Automotive Prediction", retrieved on May 11, 2017 from http://cs231n.stanford.edu/reports2016/102_Report.pdf, pp. 1-9.
Chen, "Going Deeper with Convolutional Neural Network for Intelligent Transportation", Nov. 2015, 69 pages.
(Continued)

Primary Examiner — Stephen P Coleman
(74) Attorney, Agent, or Firm — Ditthavong & Steiner, P.C.

(57) ABSTRACT

An approach is provided for object detection. The approach involves receiving a feature map encoding high level features of object contours detected in an image divided into a plurality of grid cells, and further encoding start locations of each detected object contour. The approach also involves selecting a grid cell including a start location of an object contour. The approach further involves determining a precise location of the start location within the grid cell. The approach further involves determining a set of feature values from a set of proximate grid cells. The approach further involves processing the precise location and the set of feature values using a machine learning network to output a displacement vector to indicate a next coordinate of the object contour, and updating a cursor of the machine learning network based on the displacement vector.

20 Claims, 15 Drawing Sheets

(56) References Cited

OTHER PUBLICATIONS

Chen, "Extracting Cognition Out of Images for the Purpose of Autonomous Driving", May 2016, retrieved on May 11, 2017 from http://orfe.princeton.edu/~alaink/Theses/chenyiPhDfinal_ExtractingCognitionOutOfImagesForThePurposeOfAutonomousDriving.pdf, pp. 1-193.

Durrant-Whyte et al., "Simultaneous Localization and Mapping: Part I", The Essential Algorithms, Robotics & Automation Magazine, IEEE, vol. 13, No. 2, Jun. 5, 20006, pp. 99-108.

Lowe, "Object recognition from local scale-invariant features", The Proceedings of the Seventh IEEE International Conference on Computer Vision, vol. 2, Sep. 20-27, 1999, 8 Pages.

Gurghian et al., "DeepLanes: End-To-End Lane Position Estimation using Deep Neural Networks", IEEE Conference on Computer Vision and Pattern Recognition Workshops (CVPRW), 2016, pp. 38-45.

Huval et al., "An Empirical Evaluation of Deep Learning on Highway Driving", Robotics, Computer Vision and Pattern Recognition, vol. 3, Apr. 17, 2015, pp. 1-7.

Redmon et al., "You Only Look Once: Unified, Real-Time Object Detection", Computer Vision and Pattern Recognition, Computer Science, vol. 5, May 9, 2016, 10 Pages.

"Recurrent Net Dreams Up Fake Chinese Characters in Vector Format with TensorFlow", Dec. 27, 2015, retrieved on May 11, 2017 from http://blog.otoro.net/2015/12/28/recurrent-net-dreams-up-fake-chinese-characters-in-vector-format-with-tensorflow/, 19 Pages.

Graves, "Generating Sequences With Recurrent Neural Networks", Neural and Evolutionary Computing, Computer Science, vol. 5, Jun. 5, 2014, 43 Pages.

Ba et al., "Multiple Object Recognition with Visual Attention", Conference Paper at ICLR 2015, vol. 2, Apr. 23, 2015, 10 Pages.

Mobileye, "Our Vision. Your Safety", 2017, retrieved on May 11, 2017 from http://www.mobileye.com/en-us/technology/, 2 Pages.

\* cited by examiner

METHOD, APPARATUS, AND SYSTEM FOR REAL-TIME OBJECT DETECTION USING A CURSOR RECURRENT NEURAL NETWORK

BACKGROUND

Autonomous driving has quickly become an area of interest for vehicle manufactures and navigation and mapping service providers. One particular area of interest is the use of computer vision to enable mapping and sensing of a vehicle's environment to support autonomous or semi-autonomous operation. Advances in available computing power have enabled this mapping and sensing to approach or achieve real-time operation through, e.g., machine learning (e.g., neural networks). As a result, one application of computer vision techniques in autonomous driving is localization of the vehicle with respect to known reference marks objects on or near a roadway. Accordingly, service providers face significant technical challenges when applying computer vision to detect such objects (e.g., lane lines, signs, or other surface markings) from a captured image, particularly when attempting to detect the objects in real-time or near real-time.

Some Example Embodiments

Therefore, there is a need for an approach for automatically detecting object contours (e.g., lines outlining an object or portion of an object) from captured images (e.g., a video capture stream from an autonomous vehicle).

According to one embodiment, a computer-implemented method computer-implemented method for detecting one or more object contours in an image comprises receiving a feature map. The feature map encodes high level features of the one or more object contours detected in the image with respect to a plurality of grid cells, and further encodes respective start locations of each of the one or more object contours with respect to the plurality of grid cells. The method also comprises selecting a grid cell from among the plurality of grid cells including at least one of the respective start locations of at least one of the one or more object contours. The method further comprises determining a location of the at least one start location within the selected grid cell. The method further comprises determining a set of feature values from a subset of the plurality of grid cells of the feature map within a proximity threshold of the selected grid cell. The method further comprises processing the location and the set of feature values using a machine learning network (e.g., a recurrent neural network) to output a displacement vector to indicate a next coordinate of the at least one object contour, and updating a cursor of the machine learning network based on the displacement vector.

According to another embodiment, an apparatus for detecting one or more object contours in an image comprises at least one processor, and at least one memory including computer program code for one or more computer programs, the at least one memory and the computer program code configured to, with the at least one processor, cause, at least in part, the apparatus to receive a feature map. The feature map encodes high level features of the one or more object contours detected in the image with respect to a plurality of grid cells, and further encodes respective start locations of each of the one or more object contours with respect to the plurality of grid cells. The apparatus is also caused to select a grid cell from among the plurality of grid cells including at least one of the respective start locations of at least one of the one or more object contours. The apparatus is further caused to determine a location of the at least one start location within the selected grid cell. The apparatus is further caused to determine a set of feature values from a subset of the plurality of grid cells of the feature map within a proximity threshold of the selected grid cell. The apparatus is further caused to process the location and the set of feature values using a machine learning network (e.g., a recurrent neural network) to output a displacement vector to indicate a next coordinate of the at least one object contour, and to update a cursor of the machine learning network based on the displacement vector.

According to another embodiment, a non-transitory computer-readable storage medium for detecting one or more object contours in an image carries one or more sequences of one or more instructions which, when executed by one or more processors, cause, at least in part, an apparatus to receive a feature map. The feature map encodes high level features of the one or more object contours detected in the image with respect to a plurality of grid cells, and further encodes respective start locations of each of the one or more object contours with respect to the plurality of grid cells. The apparatus is also caused to select a grid cell from among the plurality of grid cells including at least one of the respective start locations of at least one of the one or more object contours. The apparatus is further caused to determine a location of the at least one start location within the selected grid cell. The apparatus is further caused to determine a set of feature values from a subset of the plurality of grid cells of the feature map within a proximity threshold of the selected grid cell. The apparatus is further caused to process the location and the set of feature values using a machine learning network (e.g., a recurrent neural network) to output a displacement vector to indicate a next coordinate of the at least one object contour, and to update a cursor of the machine learning network based on the displacement vector.

According to another embodiment, an apparatus for detecting one or more object contours in an image comprises means for receiving a feature map. The feature map encodes high level features of the one or more object contours detected in the image with respect to a plurality of grid cells, and further encodes respective start locations of each of the one or more object contours with respect to the plurality of grid cells. The apparatus also comprises means for selecting a grid cell from among the plurality of grid cells including at least one of the respective start locations of at least one of the one or more object contours. The apparatus further comprises means for determining a location of the at least one start location within the selected grid cell. The apparatus further comprises means for determining a set of feature values from a subset of the plurality of grid cells of the feature map within a proximity threshold of the selected grid cell. The apparatus further comprises means for processing the location and the set of feature values using a machine learning network to output a displacement vector to indicate a next coordinate of the at least one object contour, and means for updating a cursor of the machine learning network based on the displacement vector.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting object contours using a cursor recurrent neural network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
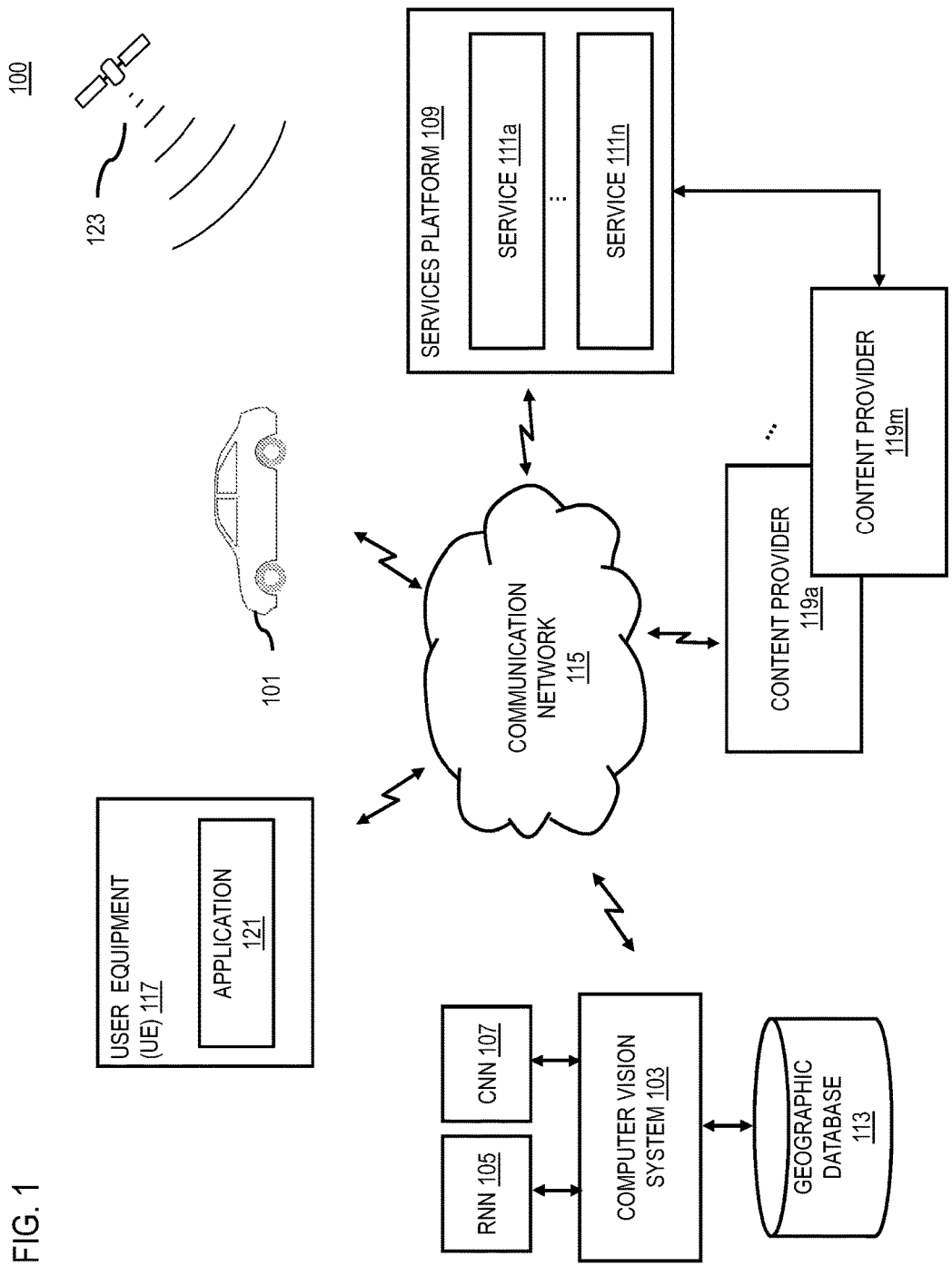
FIG. 1 is a diagram of a system capable of detecting object contours using a cursor recurrent neural network, according to one embodiment.

FIG. 1 is a diagram of a system capable of detecting object contours using a cursor recurrent neural network, according to one embodiment. As discussed above, autonomous driving has quickly become an area of intense interest, with recent advances in machine learning, computer vision and computing power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road objects, features, and/or obstacles using a computer vision system (e.g., a computer vision system 103).

A second application of vision techniques in autonomous driving is localization of the vehicle 101 with respect to a map of reference landmarks or objects (e.g., lane lines, signs, surface markings, etc.). Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to objects or features represented in a map enables the incorporation of other real-time information into route planning. Such information could include traffic, areas with unsafe driving conditions (e.g., ice, fog, potholes), and temporary road changes like construction.

With respect to lane localization and also generally with respect to autonomous driving, high accuracy and real-time localization of vehicles 101 are needed. Traditionally, most vehicle navigation systems accomplish this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery. These features can then be matched to a database of features to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features or objects of different types (e.g., features or objects such as lane markings, lane lines, signs, surface markings, etc.) can provide better and more accurate localization.

In response to these issues, the system 100 of FIG. 1 (e.g., including the computer vision system 103) focuses on detecting high level features or objects that have semantic meaning for human beings. One such feature that is important to autonomous driving is the detection of lane features (e.g., lane markings, lane lines, Botts' dots, reflectors, etc.) and corresponding lane models. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101, and significant computer vision resources are dedicated to this task. It is noted that lane features are provided by way of illustration and not as limitations. It is contemplated that any other object on or near a roadway can be used for localization. Accordingly, in embodiments where lane lines or lane features are discussed, other objects or features (e.g., signs, surface markings, etc.) can be used equivalently.

One technique that has shown significant ability to detect lanes is the use of convolutional neural networks. Machine learning networks such as neural networks have shown unprecedented ability to recognize objects in images, understand the semantic meaning of images, and segment images according to these semantic categories. Despite the successful use of neural networks to detect lane markings and create lane models, a fundamental problem remains. Neural network-based lane detectors must compromise between flexibility of representation and semantic understanding of the lane geometry. On the one hand, a pixel-based segmentation of an image of a road can show every pixel that corresponds to a lane line. Yet converting this image mask into a lane model requires a significant amount of additional processing. On the other hand, a model that outputs parametric representations of lane lanes can impose a large bias onto the potential arrangement of lane lines. This tradeoff is particularly notable when one considers the fact that the most successful implementations of neural networks are often those for which the network can be trained completely end-to-end. Such end-to-end networks have shown increased accuracy and speed.

In addition, the success of localization based on features from an image depends on the precise localization of those features within the image. From this standpoint, pixel-based approaches present another challenge. To increase the precision of the network output, more pixels must be used. Thus, an increase in the precision of the localization of features requires an increase in the number of pixels, which in turn increases the number of computational operations and the potentially the number of weights for the network. This behavior is undesirable, and in general parametric representations do not suffer from this problem because they can specify the values of parameters with arbitrary precision.

In one embodiment, the system 100 can further improve the performance of parametric representations of lane lines by addressing the problem of potential bias arising from changes in physical arrangements of detected lane lines. This problem arises because machine learning networks such as neural networks are usually a fixed size, and as a result have a fixed size input and output. This fixed sized contrasts with the observation that in many cases, there can be a variable number lane lines detected per image and a variable number of polyline points representing each detected lane line. Therefore, representing this variability in a fixed size output can be challenging. One possible solution could be for the neural network to output a tensor that is large enough to capture even a large number of points and lines. However, in this case the correspondence between outputs and lines is still not well defined. For example, output 1 of the neural network could correspond to the left-most lane, output 2 could correspond to the middle lane, and output 3 could correspond to the right lane. In this scenario, the detection of another lane located to the left of the previously left-most lane of output 1 would affect every other lane. This is because to maintain the same left-to-right lane ordering under the traditional fixed output constraint, the previously detected lanes would have to be moved to outputs 2, 3, and 4, to allow output 1 to correspond to newly detected left-most lane. This dependence of this type of parametric representation of one lane line on the existence of other lane lines is not ideal, because if the system 100 makes one mistake in detecting or not detecting a lane line, that mistake could affect all other lane markings as well.

To address this problem with parametric representations in neural networks or other equivalent machine learning network, the system 100 can, for instance, apply a grid-based approach to parametrically represent detected lane lines. For example, an input image is divided into grid cells. Then, each grid cell can be independently process by an assigned neuron or node of the neural network to encode characteristics of the lane lines within the individual (e.g., locations along the cell border where a lane line is predicted to cross, the angle at which the line crosses the cell border, a lane line type, etc.). The individual cell-based representations can then be decoded or combined into a polylines or lane models representing the detected lane lines.

This approach has excellent performance in terms of both precision and recall, but several challenges remain. First, it is often difficult to extend such a grid-based approach to continuous objects. For example, this grid-based implementation may only achieve a maximum of 95% recall because the ends of lanes that fall within cells are not captured. It is also challenging to use this grid-based approach to predict many small objects that are close to one another because the approach has a baked-in length scale (e.g., based on the length of each grid cell). While the approach generalizes well for objects that are larger than the grid cell size, it may not gracefully handle large numbers of small objects. Second, this approach relies on an encoder-decoder scheme for converting the lane representation to the individual grid-based representations and back. While neural networks can learn the encoded representation, decoding this representation back into a natural representation of lanes (e.g., polylines) is not trivial. Developing decoders takes development time, and the decoders themselves take valuable computational time when run in real-time scenarios. Therefore, service providers face significant technical challenges to developing a lane detection model to would be trainable end-to-end without the use of encoders and decoders.

To address these challenges, the system 100 introduces an approach that allows end-to-end training of a machine learning network (e.g., neural network) for the identification of objects (e.g., the contours of objects such as lane lines) and their respective attributes from input images using a computer vision system 103. In one embodiment, the machine learning network is a recurrent neural network (RNN) 105 in which the nodes or neurons are able to use their internal memories to store sequential information (e.g., sequences of inputs such as from other nodes or neurons or arbitrary lengths) to generate an output. In contrast, traditional neural networks (e.g., a convolutional neural network (CNN) 107) assume that all inputs and outputs are independent of each other. In one embodiment, the system 100 takes advantage of the fact that lane lines are naturally coded as polylines, which are sequences of points. For example, these polylines naturally code for a path that can be traced out by the RNN 105 as it iterates over a high-level feature map, for instance, produced by the CNN 107.

Accordingly, in one embodiment, the system 100 uses the RNN 105 or other equivalent machine learning or neural network to traverse a feature map (e.g., a convolutional feature map encoding lane features detected from an input image by the CNN 107) like a cursor (e.g., a cursor recurrent neural network). During the traversal, the RNN 105 uses information from its current location in the feature map to determine a location where the RNN 105 should go next to follow a detected lane line or contour of an object depicted in an input image. By way of example, in one embodiment, an object contour refers to the outline of any depicted object or portion thereof (e.g., lane lines, signs, surface markings, other vehicles, buildings, etc.). As the RNN 105 iteratively traces the detected object contour (e.g., a detected lane line) from location to location, the RNN 105 can also iteratively and directly output the coordinates of the object contour (e.g., corresponding to the cursor locations) without the use of a decoder. In other words, the system 100 can advantageously detect road feature objects (e.g., lane lines) in input image and then trace out their contours or outlines in the image input using the RNN 105. By avoiding the use of a decoder to determine the contour line coordinates, the system 100 advantageously reduces computational resources used for lane or object contour detection when compared to traditional detectors. In addition, because the embodiments of the RNN 105 described herein is an end-to-end or single stage solution to lane or object contour detection, the system 100 is end-to-end trainable to minimize performance losses for a multi-stage lane detection pipeline. The highly flexible representation of lane or object contour lines of the various embodiments described herein also enable the system 100 to learn or use any vector representation of contour lines.

Figure 2:
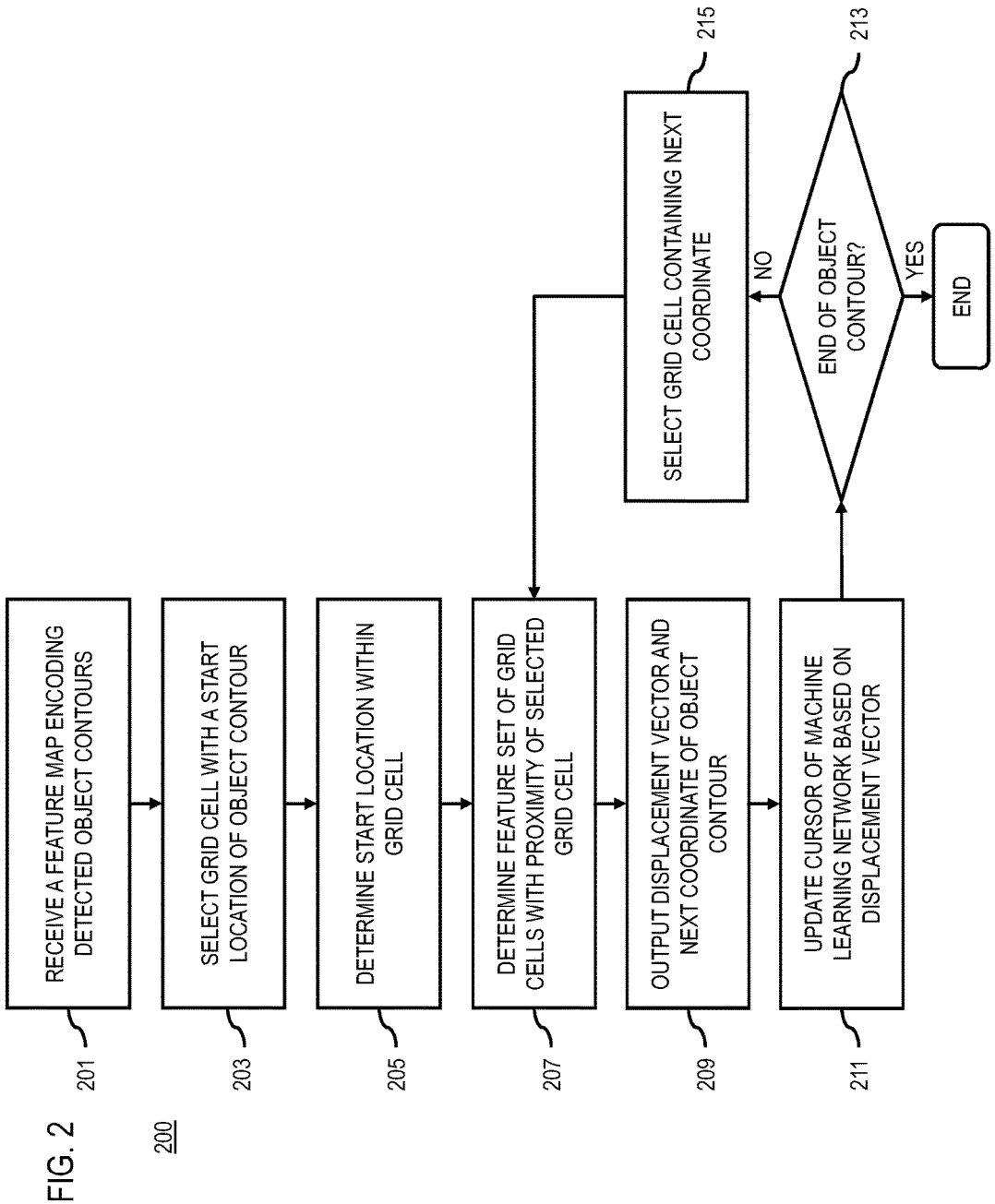
FIG. 2 is a flowchart of a process for detecting object contours using a cursor recurrent neural network, according to one embodiment.
Figure 11:
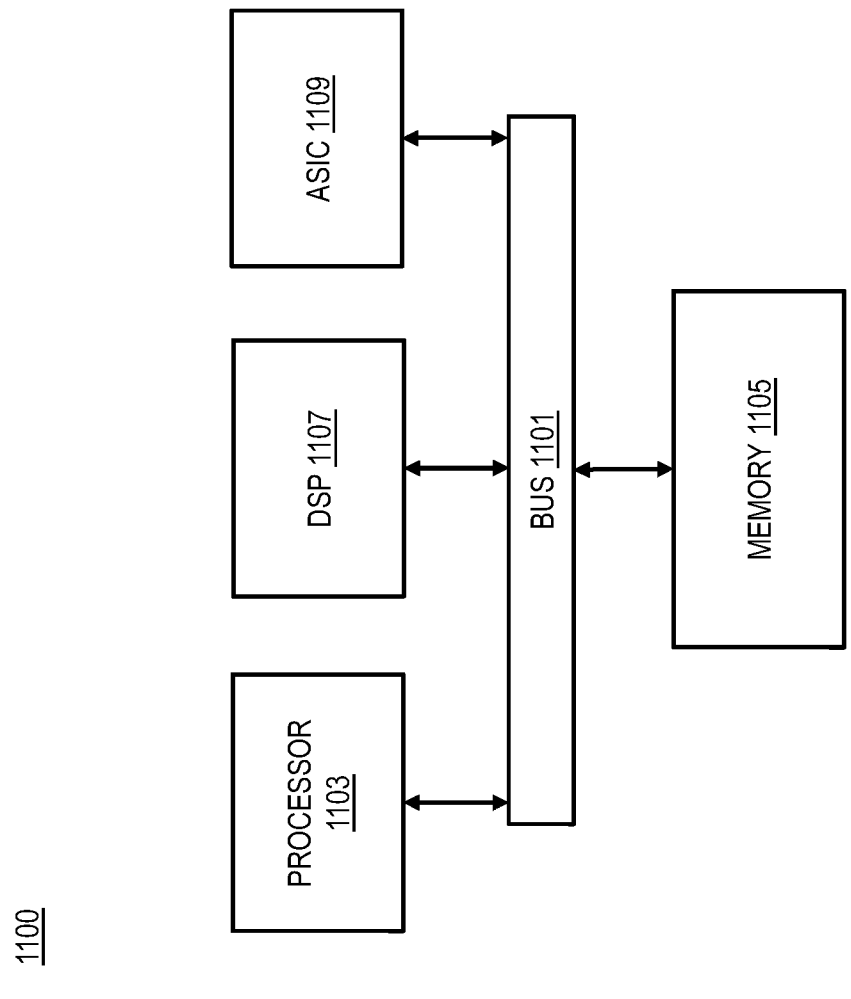
FIG. 11 is a diagram of a chip set that can be used to implement an embodiment of the invention.

FIG. 2 is a flowchart of a process for detecting object contours using a cursor recurrent neural network, according to one embodiment. In one embodiment, the computer vision system 103, the RNN 105, and/or the CNN 107 may perform one or more portions of the process 200 and may be implemented in, for instance, a chip set including a processor and a memory as shown in FIG. 11. As such, the computer vision system 103, the RNN 105, and/or the CNN 107 can provide means for accomplishing various parts of the process 200. In addition or alternatively, a services platform 109 and/or one or more services 111a-111n (also collectively referred to as services 111) may perform any combination of the steps of the process 200 in combination with the computer vision system 103, the RNN 105, and/or the CNN 107, or as standalone components. Although the process 200 is illustrated and described as a sequence of steps, it is contemplated that various embodiments of the process 200 may be performed in any order or combination and need not include all of the illustrated steps. Moreover, although the various embodiments described herein are discussed with respect to detecting object contours that are lane lines or lane features, it is contemplated that the object contour can be of any type of object captured in the input image. The process 200 is discussed with respect to the examples of FIGS. 2-6, 7A-7D, and 8.

In step 201, the computer vision system 103 receives a feature map. In one embodiment, the feature map encodes high level features of the one or more lane or object contour lines detected in the image with respect to a plurality of grid cells, and further encodes respective start locations of each of the one or more lane lines or object contours with respect to the plurality of grid cells. The high level features of the one or more lane lines or object contours include, but are not limited to, a location of the one or more lane lines or object contours, a slope of the one or more lane lines or object contours, a characteristic of the one or more lane lines or object contours, or a combination thereof.

Figure 3:
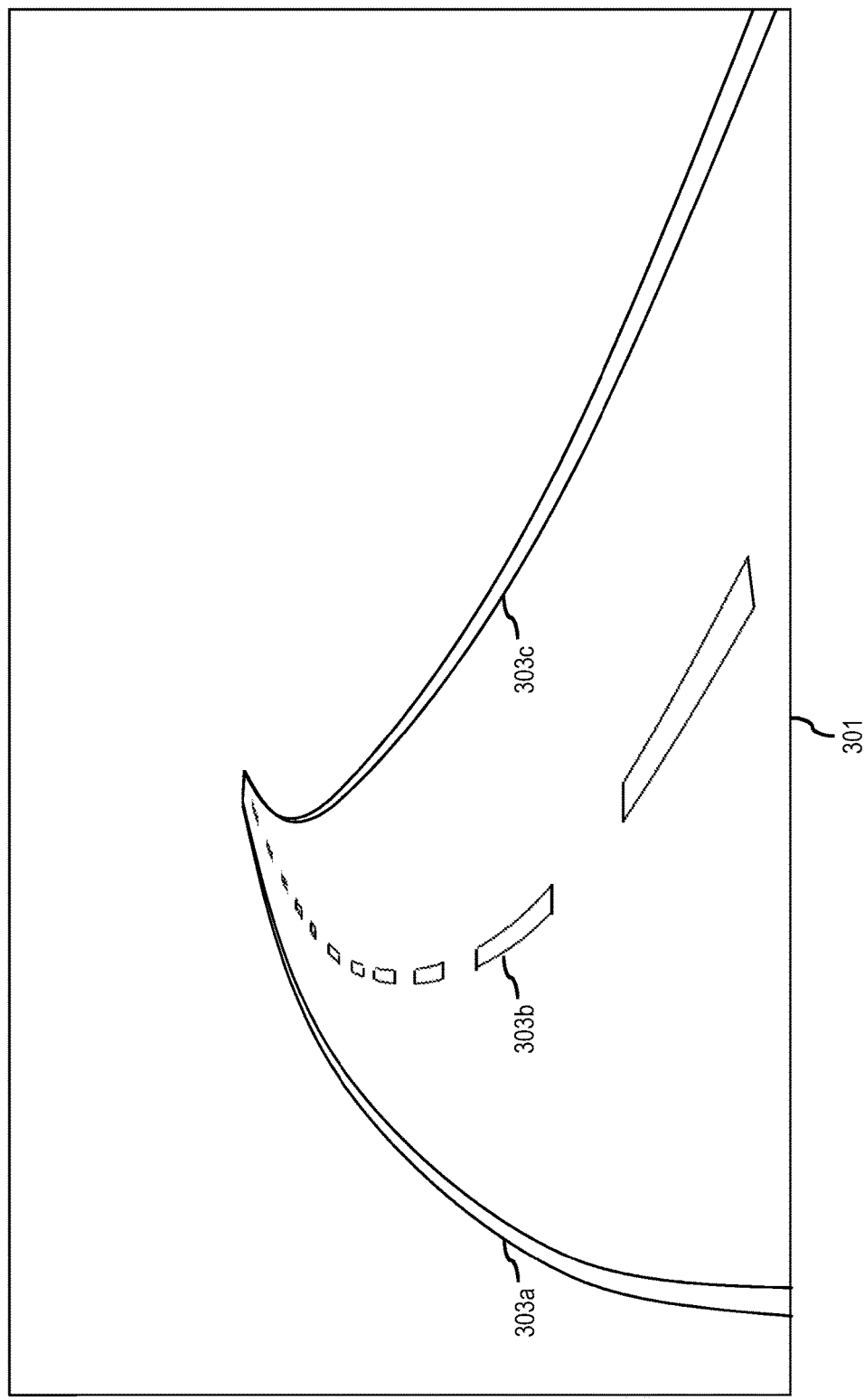
FIG. 3 is a diagram of an input image of object contours captured by a vehicle camera system, according to one embodiment.

FIG. 3 is a diagram of an example input image 301 depicting lane lines 303a-303c as example object contours captured by a vehicle camera system that can be used to generate the feature map, according to one embodiment. In this example, the image 301 is captured in real-time by a camera system of a vehicle 101 as raster images at a predetermined pixel resolution. In one embodiment, the image 301 can be captured using cameras sensitive to visible light, infra-red, and/or any other wavelength of light. To support real-time operation, the image 301 can be part of an image stream captured at a relatively high frequency (e.g., 10 Hz, 30 Hz, or higher). Each frame of the image stream can then be processed to provide real-time detection of lane-lines or other object contours using the various embodiments described herein to output lane or object contour coordinates or models in the form of polylines or equivalent representation. In one embodiment, the image 301 can be generated using any other sensor of the vehicle 101 capable such as LIDAR, RADAR, and/or the like. In yet another embodiment, the input image 301 can be received from a source or component external to the vehicle 101 (e.g., from another vehicle 101, service platform 109, services 111, content providers 119, and/or equivalent), and need not be generated by the vehicle 101 or the computer vision system 103 itself.

Figure 4:
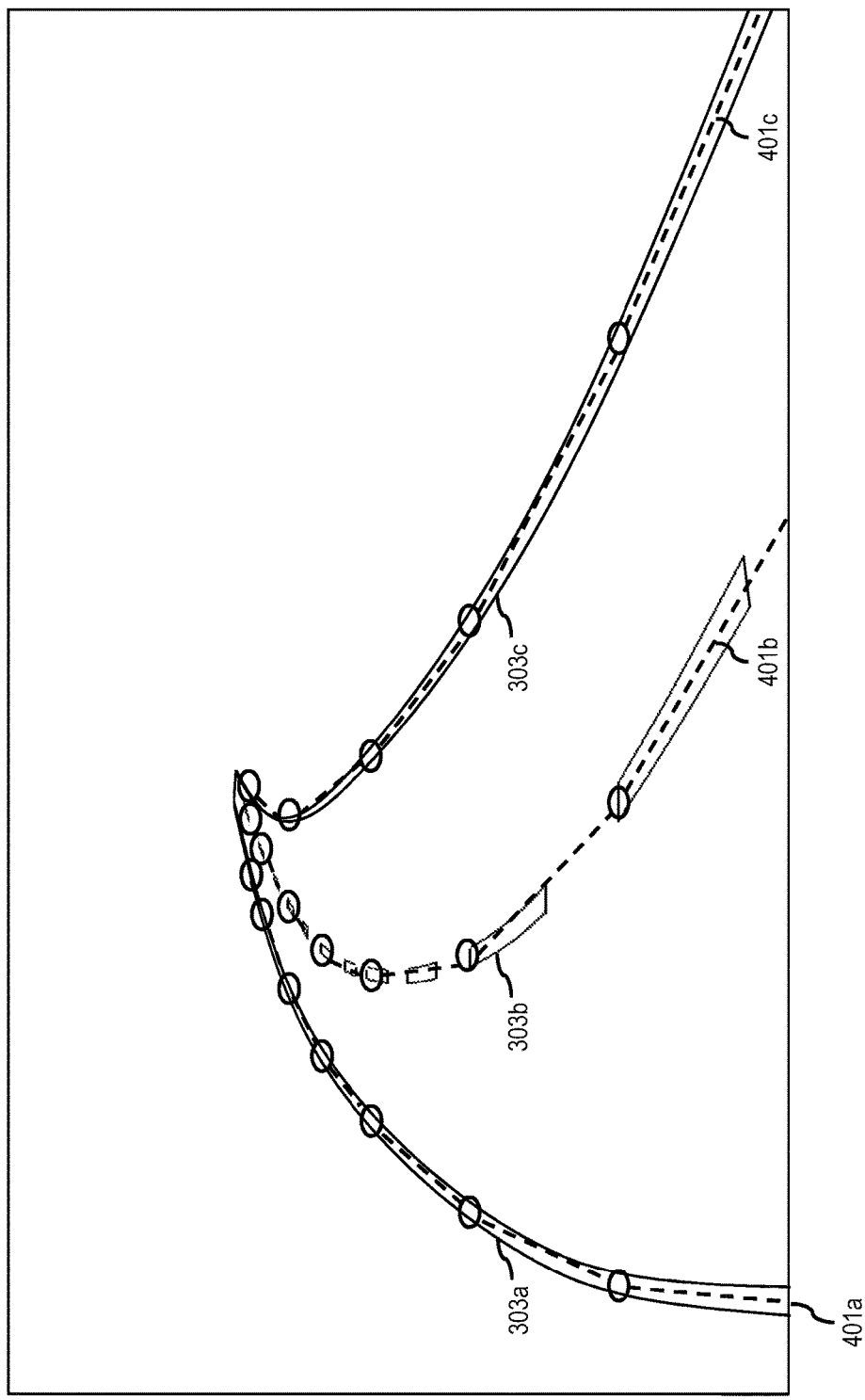
FIG. 4 is a diagram of a polyline representation of object contours detected in an input image, according to one embodiment.

In one embodiment, as shown in FIG. 4, lane models (and similarly models of other object contours) are typically represented as sets of polylines 401a-401c, in which the centerlines of the respective lanes 303a-303c are represented by piecewise-linear functions with an arbitrary number of points. In the example of FIG. 4A, the polylines 401a-401c represent each lane 303a-303a as a series of line segments (e.g., shown as dotted lines) with articulation points between the line segments indicated by circles. Although traditional machine learning network such as the CNN 107 are very capable of detecting lane features in input images (e.g., the input image 301) to output a feature map, it can be difficult for the CNN 107 or equivalent machine learning networks to output polylines to represent lane or object contour lines for the reasons stated above. As discussed above, traditional convolutional neural networks have fixed-size input and output tensors, and thus do not handle variable length sequences like polylines well.

Figure 5:
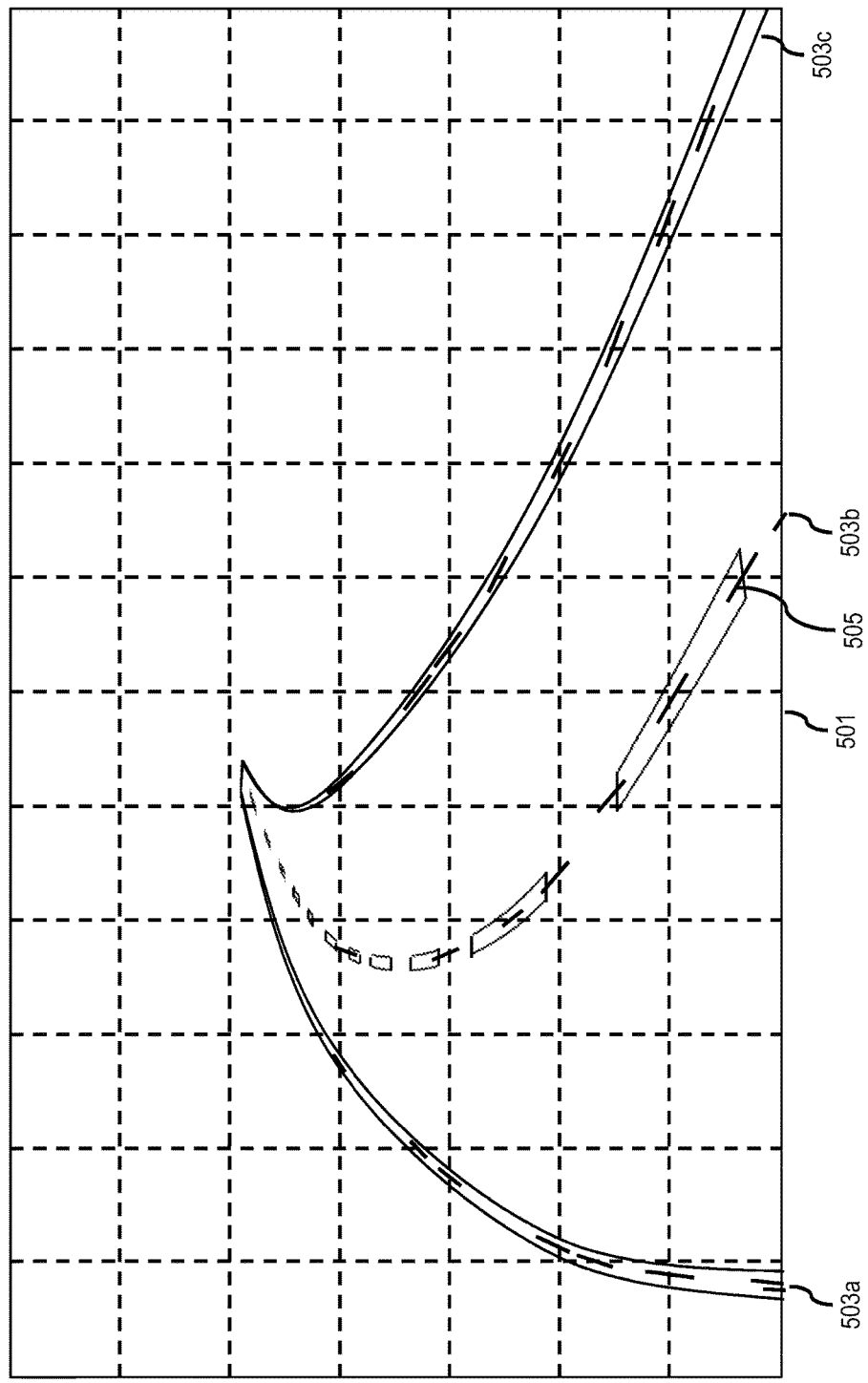
FIG. 5 is a diagram of a parametric representation of object contours detected in an input image, according to one embodiment.

FIG. 5 illustrates an example of a grid-cell based approach for parametrically representing object contours the overcome the limitation of convolutional neural networks discussed above, according to one embodiment. For example, the approach of FIG. 5 uses a more natural representation of lane or object contour lines for a convolutional neural network that is based on a grid of squares overlaid with the input image. In the example of FIG. 5, a grid 501 segments the input image (e.g., the image 301 as shown in FIG. 3) into individual grid cells. In one embodiment, such a grid 501 can be output by a fully convolutional neural network (e.g., the CNN 107), which has the advantage of being computationally fast without having an excess of parameters that might lead to overfitting. For example, with respect to the CNN 107 or equivalent machine learning network, each of the grid cells can be processed by a different neuron or processing node to more efficiently employ the available neurons or nodes and distribute the computational load for processing the entire input image. In other words, in one layer of the neural network, the scope of each neuron corresponds to the extent of the input image area within each respective grid cell. Each neuron or node can make its respective prediction (e.g., detection of a lane line) independently for each individual grid cell. For example, as part of making each prediction, each neuron processes the portion of the image data falling within the boundary of its grid cell to extract high-level features of the detected lane (e.g., slope, location, start location, end location, lane feature type, etc.). As a result of this segmentation, the basic unit of representation then becomes each cell of the grid, in which each lane line is parametrically encoded from the features extracted from each cell. The aggregate of the features extracted from the grid cells can represent a feature map for the image 301.

As shown in FIG. 5, an output parametric representation of the entire input image 301 is superimposed on the initial input image (e.g., input image 301). In this example, line segments are drawn from the intercepts of lane lines at the appropriate angles at each cell edge to represent a detected object contour. An example of one line segment is line segment 505. The remaining line segments are not labeled, but are depicted as short solid lines at each edge of a cell at which a line crosses. These series of line segments correspond for instance to respective lane lines. The independent output of each cell can then be combined through decoding process to create lane models 503a-503c to represent the detected lane features (e.g., a polyline representation of the lane lines detected in the image). The term "independent" indicates, for instance, that the parametric representation of one grid cell does not have a direct association or link to any other cell. Accordingly, each grid cell forms a type of mosaic representation, and a decoding process can be used to link the independent grid-cell based parametric representations into respective lane models or polylines. However, as noted previously, this encoding process can be non-trivial to perform.

In response to this limitation, the computer vision system 103 reduces the input image 301 to a high-level feature map (e.g., a high-level tensor representation) using, e.g., the CNN 107 or equivalent machine learning network, and then uses a cursor recurrent neural network (e.g., the RNN 105) or equivalent machine learning network to determine and output coordinates corresponding to object contours or lane lines detected in the image 301, according to the various embodiments described herein. As with the creation of the input image 301, in one embodiment, the feature map generated from the input image 301 can be received from a source or component external to the computer vision system 103 (e.g., from another computer vision system, service platform 109, services 111, content providers 119, and/or equivalent), and need not be generated by the computer vision system 103 itself.

Figure 6:
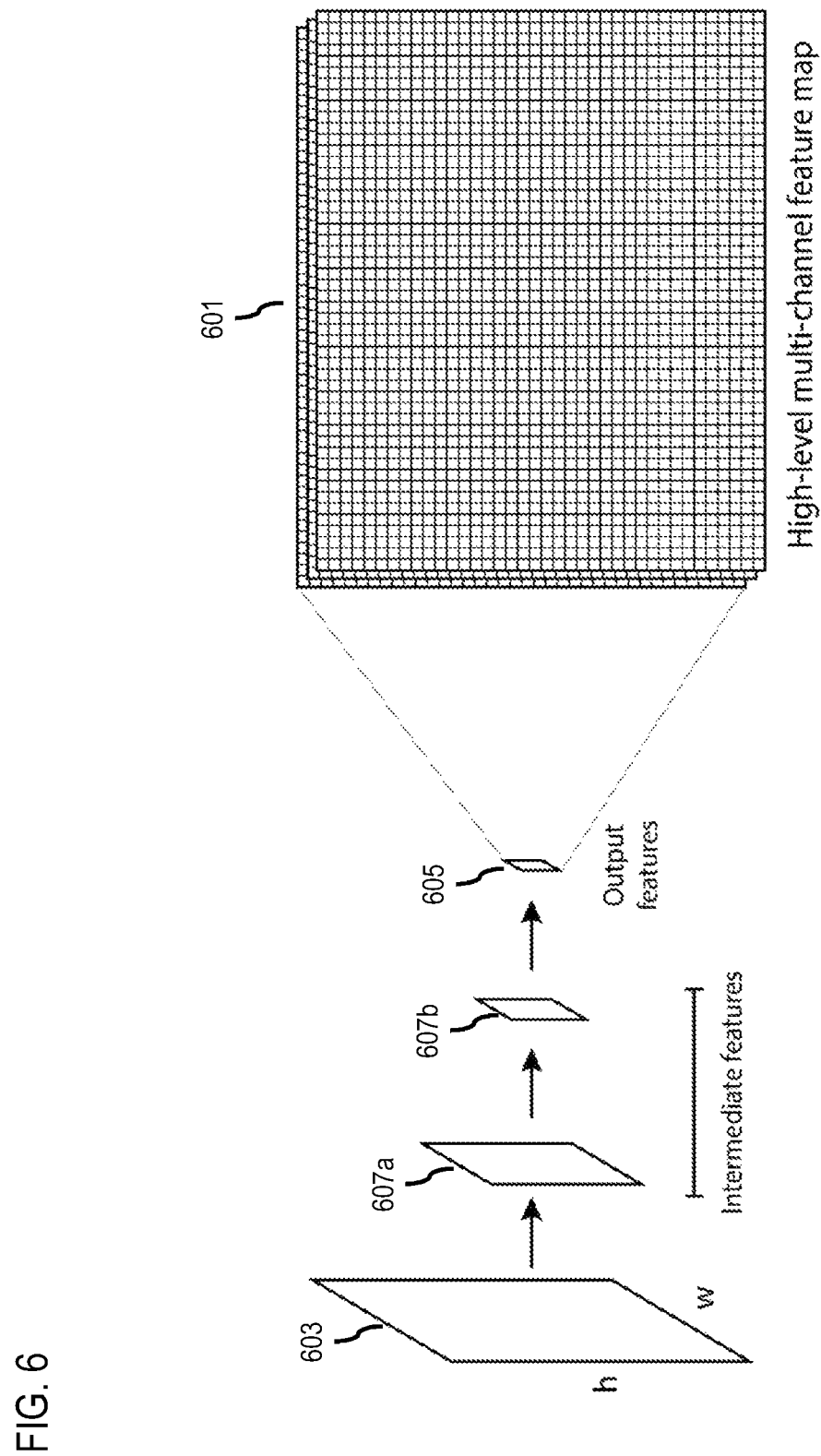
FIG. 6 is a diagram illustrating a process for creating a feature map for object contour features detected in an image, according to one embodiment.

In one embodiment, as shown in FIG. 6, the first stage of creating the feature map 601 involves converting raw pixel intensities to high-level representations of object contour or lane line features. In one such approach, a fully-convolutional network (e.g., the CNN 107 or equivalent) can be used to reduce an image 603 of size h×w×3 to a down sampled image 605 (e.g., a tensor) with a larger number of channels (e.g., h/d×w/d×c, where d is some down sampling factor and c is the number of output channels). This down sampled image or tensor 605 contains high-level information about the contents of the image 603, such as the locations, slopes, and characteristics of object contours or lane lines. In one embodiment, the convolution and downsampling process can occur through multiple intermediate layers of different scales (e.g., intermediate images or tensors 607a and 607b) which represent intermediate features used to determine the final output features of the tensor 605. Each of the tensors 605 corresponds to an image area or grid cell, such that the aggregate of all tensors generate for the image comprise the feature map 601. In one embodiment, the feature map also includes the intermediate feature layers 607a and 607b. By way of example, convolutional networks or other similar machine learning networks of a variety of architectures can be used to create the feature map. Such networks include, but are not limited to, networks that have residual connections, networks with asymmetric or dilated convolutions, and networks with specialized layers like batch-normalization layers. It is contemplated that any type of network or architecture can be used according to the various embodiments described herein.

As shown in FIG. 6, the convolutional layers will result in the feature map 601 that can be used to predict lane lines. In one embodiment, a subset of the channels of the feature map encode at least the start locations of each of lane line detected in the input image. For example, the CNN 107 can be trained to recognize or classify pixels that correspond to the start of an object contour or lane line in input images, and then encode the detected start locations and/or characteristics of the start locations into the subset of channels. In one embodiment, encoding of the start locations in the feature map 601 can be enforced directly through a loss function applied to the corresponding channels of the CNN's output. As shown in FIG. 6, each determined tensor 605 is arranged into a grid according to a corresponding area of the input image 301, thereby resulting in the feature map 601 being segmented into a plurality of grid cells. In addition or alternatively, the start locations of the object contours can be received from another component of the system 100 (e.g., the services platform 109 and/or services 111 using, for instance, any process known in art for determining start locations. In start locations are received from another component, the CNN 107 need not predict or encode the start locations of the object contours.

Figure 7A:
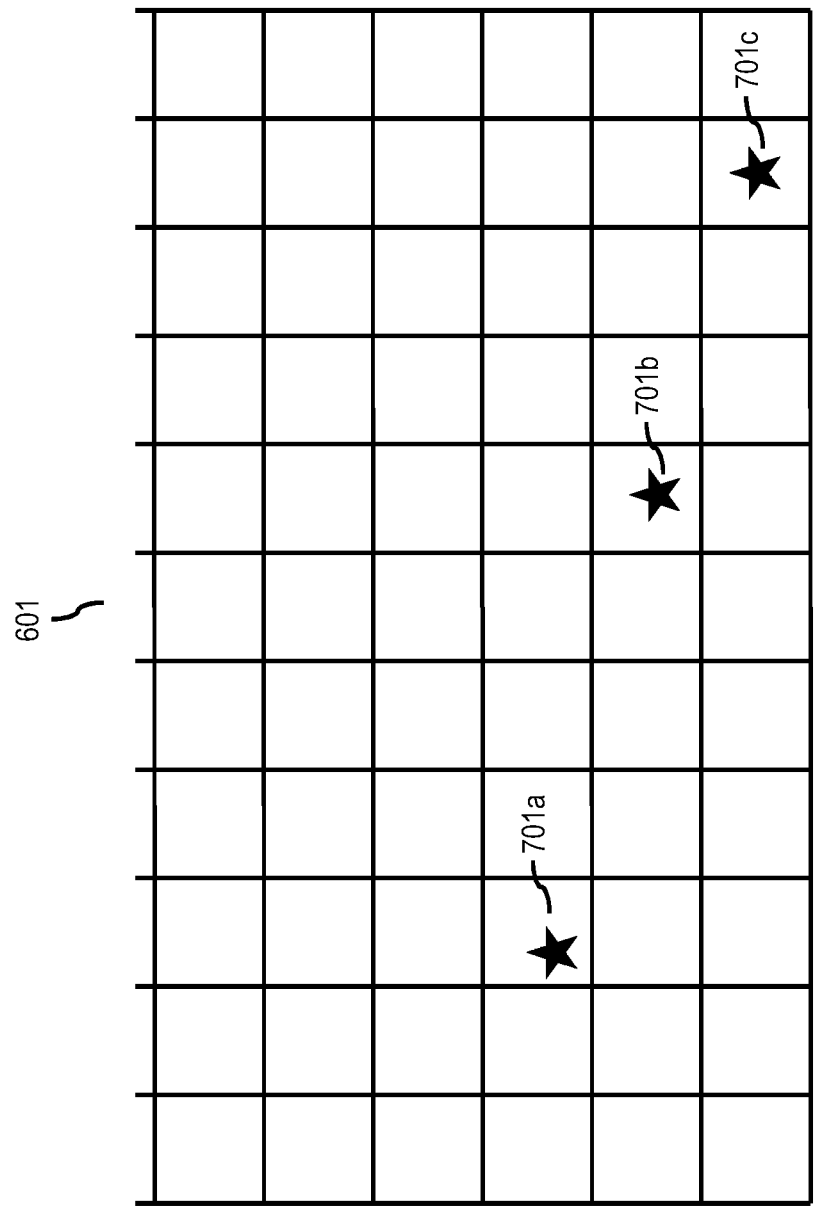
FIGS. 7A-7D are diagrams illustrating an example of using a cursor recurrent neural network to output detected object contours, according to one embodiment.

In step 203, the computer vision system 103 selects a grid cell from among the plurality of grid cells including at least one of the respective start locations of at least one of the one or more lane lines. In other words, with the feature map 601 received and the start locations of the object contours or lane lines calculated, the computer vision system 103 can instantiate one instance of the RNN 105 or equivalent machine learning network at each of the start locations of the feature map 601. FIG. 7A illustrates a portion of the feature map 601 that respective start locations 701a-701c (e.g., indicated by star symbols) for three respective lane lines. In this example, the computer vision system 103 can instantiate an instance of the RNN 105 at each of the lane line start locations 701a-701c. In this way, the instances of the RNN 105 can process each lane line in parallel to improve processing speed and provide real-time or near real-time lane detection. In one embodiment, multiple starting points can be detected or determined for the same object contour or lane line. In this case, the computer vision system 103 can instantiate an instance of the RNN 105 at each of the multiple points of the same contour line. Each instance of the RNN 105 can the respectively process its own portion of the same contour line to be combined later in a separate process (e.g., using a decoder or other process for linking together separate segments of the traced object contour). Alternatively, the each instance of the RNN 105 can process the same object contour in its entirety to provide increase robustness of results. The computer vision system 103 can then combine the resulting outputs from each instance into a single output using.

In one embodiment, the inputs for the RNN 105 include, but are not limited to the following: (1) a precise location of the current instance of the RNN 105 in either absolute coordinates or coordinates relative to the current cell, and (2) a set of feature values collected from cells near the current cell that are commonly called a glimpse. Accordingly, with respect to the first input, in step 205, the computer vision system 103 determines this precise location with respect to the current cell in which the cursor of the RNN 105 is located. If the current grid cell is the start of a lane line, the computer vision system 103 (e.g., via the respective instance of the RNN 105) determines the precise location of a start location (e.g., any of start locations 701a-701c) within the selected grid cell (e.g., the current grid cell). If the current grid cell is not the start of the an object contour or lane line, then the precise location is determined as the current location of the instance of the RNN 105 originating from the start location or another subsequent location along the detected object contour or lane line.

With respect to the second input, in step 207, the computer vision system 103 determines a set of feature values from a subset of the plurality of grid cells of the feature map within a proximity threshold of the selected grid cell. As noted above, this subset is commonly referred to as a glimpse. In one embodiment, the size of this glimpse (e.g., number of neighboring grid cells from which to extract features) can depend on the amount of contextual information that is to be used by the RNN 105 to predict what the location of the next likely point or coordinate of the detected lane line as described below in step 209. For example, the amount of contextual information and therefor the size of the glimpse can be selected so that the prediction of the next likely location or coordinate has a confidence level above a confidence threshold (e.g., at greater than 0.70 confidence). Accordingly, the glimpse can be any size more than a 3 by 3 grid of cells. In yet another embodiment, the glimpse need not be based on the grid structure imposed on the input image 301. Instead, the glimpse can be defined using any process to determine an applicable area of the input image from which the feature map is generated. For example, the process for defining a glimpse can include, but is not limited to, specifying a Gaussian center on top of the starting or current location of the RNN 105 to extend a radius from which high level features are to be computed.

Figure 7B:
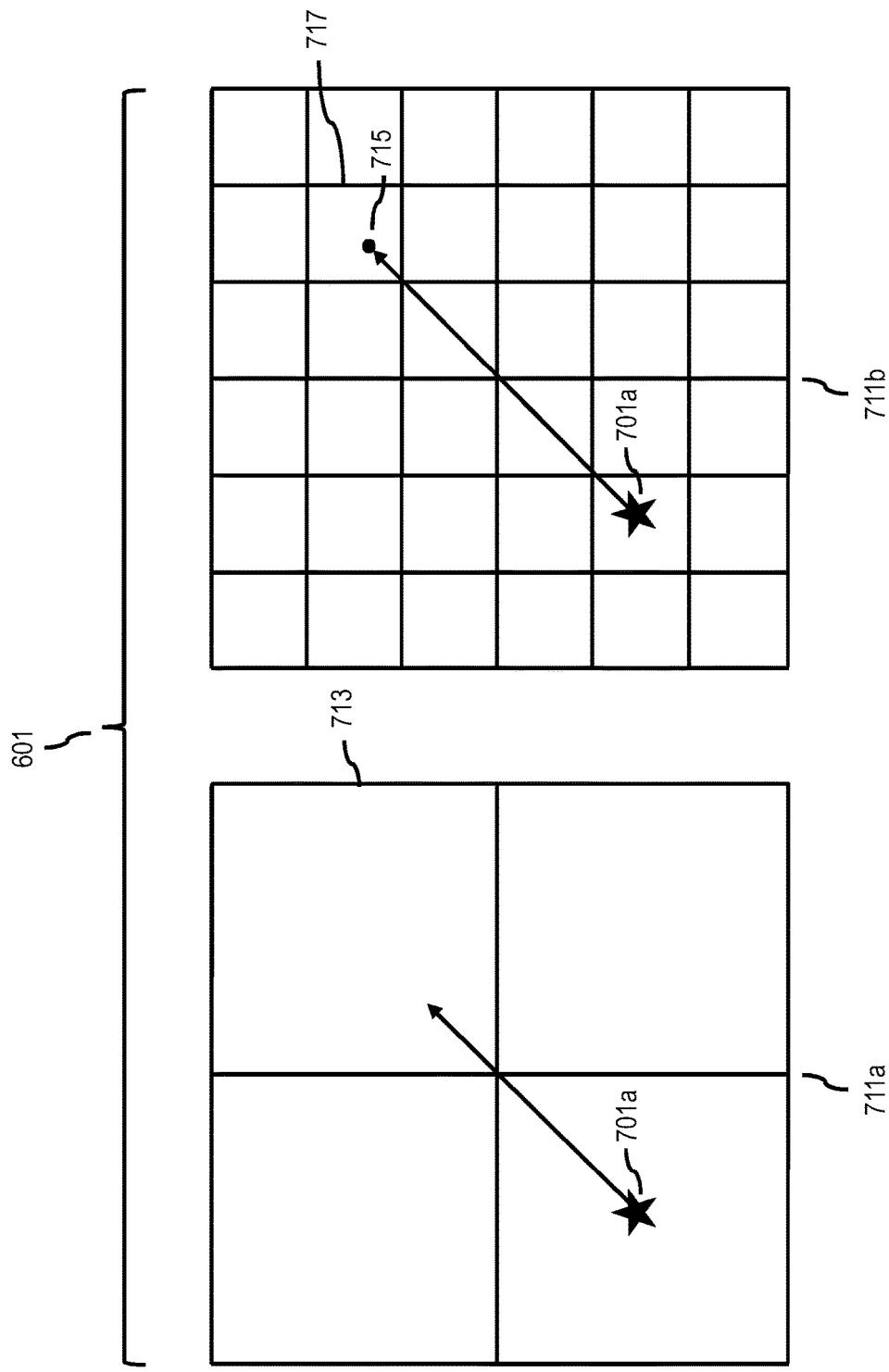

In one embodiment, the glimpse can also contain information from intermediate feature layers (e.g., intermediate layers 607a and 607b) as well. In other words, as shown in FIG. 7B, the feature map 601 can include one or more intermediate layers (e.g., intermediate layers 711a and 711b) that have respective grid cells at different respective scales or dimensions. For example, intermediate layers 711a and 711b are part of the same glimpse of the feature map 601, and therefore, cover the same area of the input image. However, intermediate layer 711a is divided into grid cells of a larger scale (e.g., a 2×2 grid covering the glimpse) than intermediate layer 711b (e.g., a 6×6 grid covering the same image area of the glimpse). As a result, the set of feature values of the glimpse will then also include the one or more intermediate layers at the different respective scales. For example, this multiscale information can be useful in providing the RNN 105 with coarse information about where generally it needs to go to follow the contour of a detected lane line, and fine-level information about where exactly the RNN 105 is relative to the detected lane line.

As shown in FIG. 7B, the feature set determined from the glimpse at the intermediate layer 711a results in a prediction that the next point in the lane line is located in the direction of grid cell 713. Because the values in the feature set is determined at a relatively coarse level, the predicted next point is determined to be somewhere in the direction of grid cell 713 but a more precise location cannot be determined with a desired level of confidence. Based on the general direction of the next point of the contour of the lane line or other object determined from the intermediate layer 711a, the fine-level information provided by the intermediate layer 711b can then be used to predict a more precise location of the next coordinate 715 of the contour in the grid cell 717 of the intermediate layer 711b. In this example, the grid cell 717 is part of a finer grid division of covering the same image area as the grid cell 713 of the intermediate 711a.

In step 209, each instance of the RNN 105 or equivalent machine learning network instantiated by the computer vision system 103 processes the input information (e.g., the precise location within the cell, and the set of feature values from the glimpse) to output a displacement vector to indicate a next coordinate of the detected lane line to which the respective instance of the RNN 105 is associated. In one embodiment, the displacement indicates a direction and distance from the current position of the RNN 105 to next predicted location of the object contour or lane line predicted from the feature values of the glimpse or nearby grid cells. In this case, the RNN 105 is trained using ground truth data to predict the displacement vector from the high-level feature values of the current cell in combination with a neighboring cells.

Figure 7C:
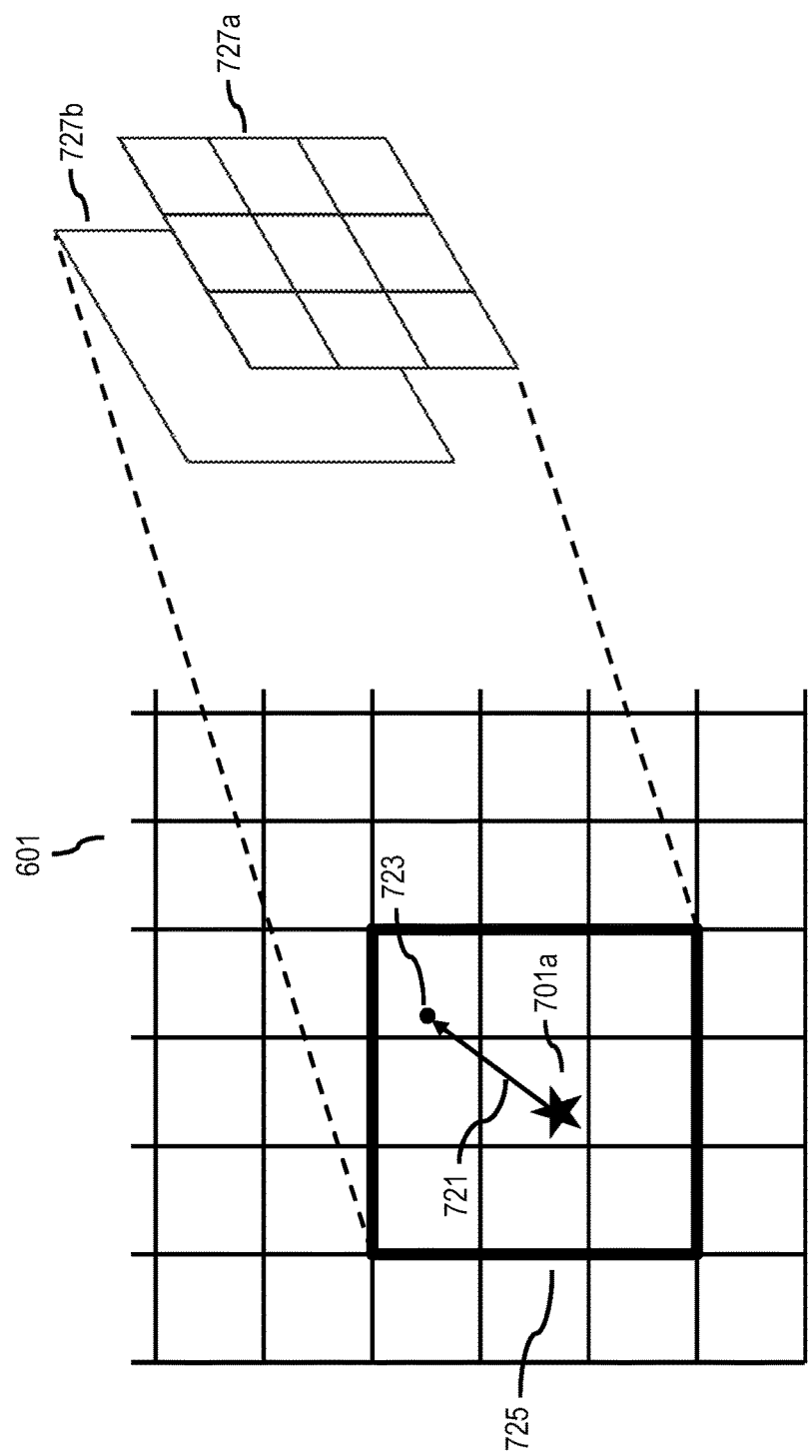

For example, as shown in FIG. 7C, the computer vision system 103 instantiates the RNN 105 at the start location 701a within the selected grid cell of the feature map 601 to output the displacement vector 721 to indicate the next coordinate 723 of the detected object contour or lane line. As described above, the inputs to the RNN 105 include the precise location of the start location 701a, and a set of high-level features extracted from a glimpse 725. In one embodiment, the grid cells of the feature map 601 to be included in the glimpse 725 is based on a distance threshold from the selected or current grid cell. In this example, the distance threshold is one grid cell of the current grid cell, resulting in the glimpse 725 comprising a total of nine grid cells (e.g., the current grid cell and the 8 immediately adjacent grid cells). As discussed above, this 3 by 3 grid provided only as an example, and the computer vision system 103 can determined the number grid cells to include and/or the process for the determining image area covered by a glimpse using any other equivalent process for defining an image area of interest.

As discussed above, in one embodiment, the glimpse 725 can include multiple features layers (e.g., the output layer 727a and one intermediate layer 727b). As shown, the intermediate layer 727b is defined a coarser scale (e.g., larger area of the input image) than the output layer 727a. Accordingly, the RNN 105 can process the set of features values at a first one of the one or more intermediate layers corresponding to a coarser one of the different respective scales to determine a general direction or a general location of the next coordinate 723. The computer vision system 103 then processes the set of feature values at a second one of the one or more intermediate layers or the output layer corresponding to a finer one of the different respective scales to determine the displacement vector or the next coordinate 723 exactly.

In one embodiment, the RNN 105 can also output additional information about the state of the detected object contour or lane line based on the input information. For example, the RNN 105 processes the location and the set of feature values to also output state information regarding the at least one object contour or lane line. The state information includes, but is not limited to, a contour line start, a contour line stop, a type of line, and/or any other characteristic of the lane line.

In step 211, the computer vision system 103 updates a location of a cursor of the RNN 105 (e.g., a cursor point the current instantiated location within the image grid) based on the displacement vector. In this way, the cursor of the RNN 105 follows along the predicted object contour or lane line as the instantiated location of the RNN 105 moves. Then a new input vector is constructed from the updated cursor location and then fed back to the RNN 105 to output the next location. In other words, in step 213, the RNN 105 determines whether the features set of the current grid cell indicate that there is an object contour or lane line stop in the current cell. If the detected object contour or lane line ends at the current cell, the object or lane detection process can end. If the not, the computer vision system 103 uses the machine learning network (e.g., the RNN 105) to select the grid cell containing the next coordinate (step 215). The RNN 105 then iteratively generates another displacement vector based on the next coordinate and another set of feature values corresponding to the next coordinate to indicate another next coordinate of the detected object contour or lane line until an end of the at least one object contour or lane line is reached (e.g., iterate over steps 207-215). If the object contour is a closed contour, the process can end with the RNN 105 returns to the start location (e.g., following a circular object from a start location and ending when the RNN 105 returns to the same start location on the circular object).

Figure 7D:
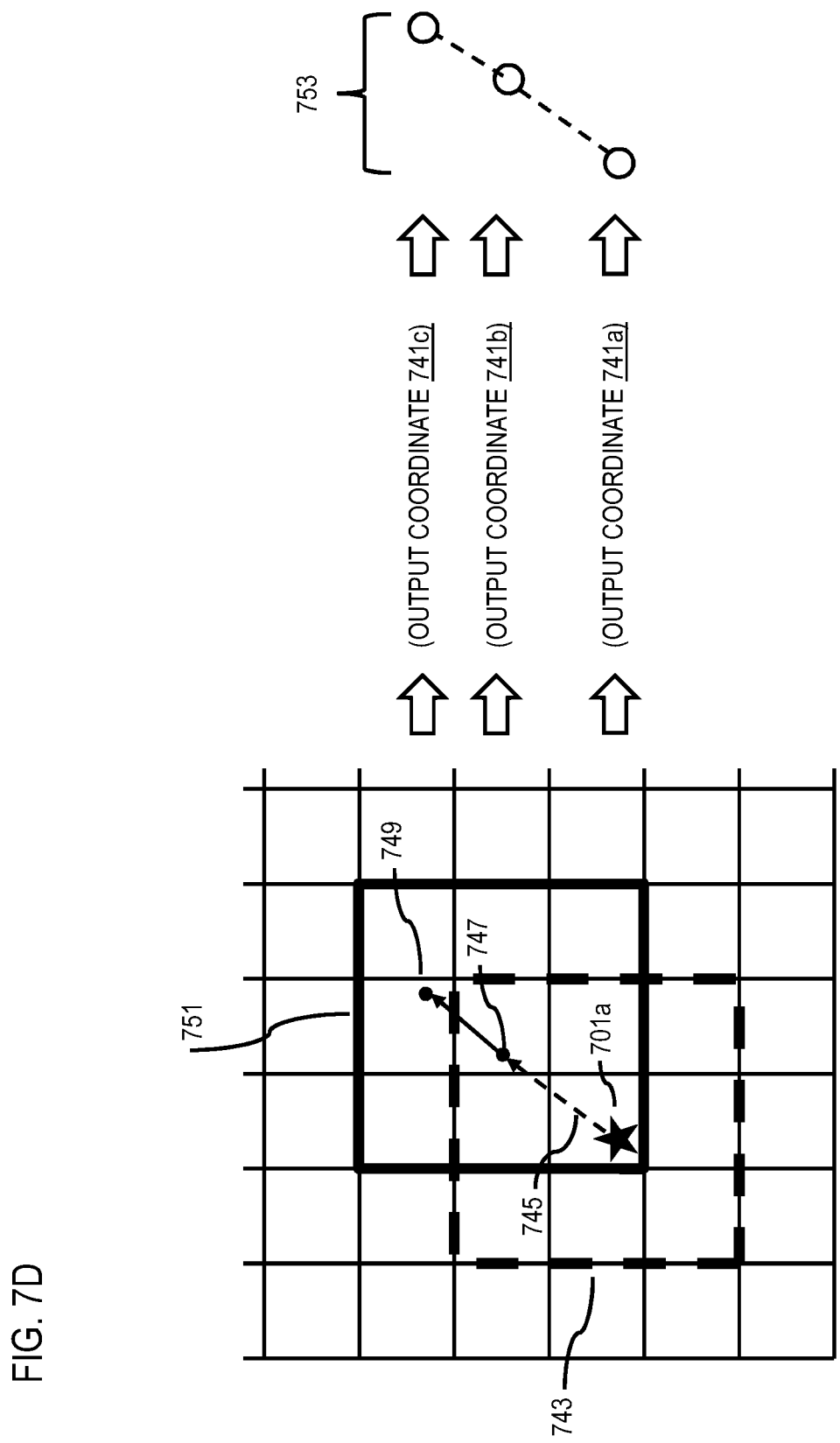

In such a way, the computer vision system 103 (e.g., via the RNN 105) can iteratively read out the coordinates of the detected object contour or lane line without needing a separate decoding process. FIG. 7D illustrates an example of a lane detection process using the approach of the various embodiments described herein. For example, as shown in FIG. 7D, the RNN 105 is first instantiated at the lane start location 701a of a detected lane line. This start location 701a can be read out by the RNN 105 as the first output coordinate 741a, which represents a first output coordinate 741a of the detected lane line. The RNN 105 the predicts the next coordinate of the detected lane line from the set of features from a first glimpse 743 and the start location 701a to compute a displacement vector 745 to the next location 747 of the detected lane line. The next location 747 can be read out as a second output coordinate 741b. The cursor of the RNN 105 is then updated to the next location 747, where new input information for the next location 747 (e.g., precise location of the next location 747, and a new feature set of a glimpse 751 associated with the next location 747) is provided to the RNN 105 to determine another next location 749 of the detected lane line. The next location 749 is then read out as a third output coordinate 741a of the detected lane line. This process can continue iteratively until the end of the lane line is reached. In one embodiment, the computer vision system 103 can use the output coordinates 741a-741c directly generated by the RNN 105 to present a polyline representation 753 of the detected line.

Figure 8:
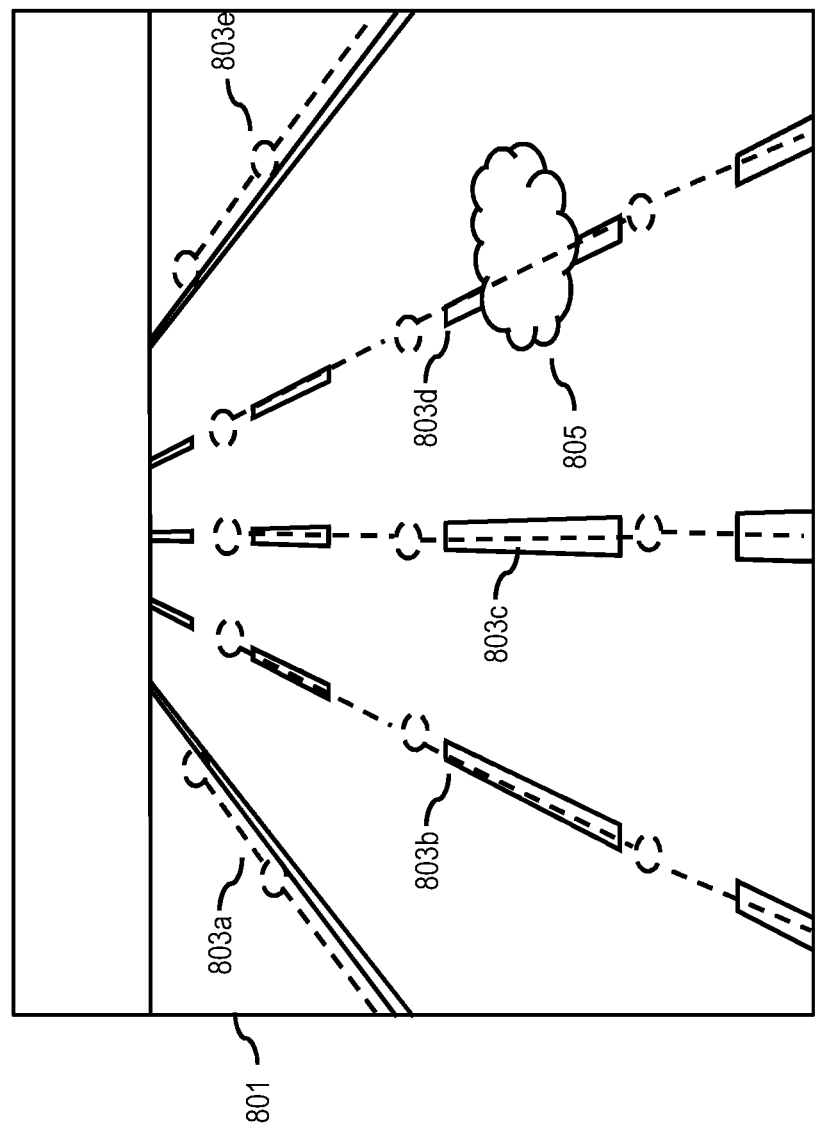
FIG. 8 is diagram illustrating an example user interface of a vehicle navigation system configured to detect object contours using a cursor recurrent neural network, according to one embodiment.

FIG. 8 is diagram illustrating an example user interface 801 of a vehicle navigation system configured to detect lane lines using a cursor recurrent neural network, according to one embodiment. In this example, the UI is displaying a real-time video image capture from a camera mounted on a vehicle 101 equipped with a computer vision system 103 capable of using a cursor recurrent neural network to detect lane lines according to the various embodiments described herein. As each image or frame of the video is captured, the computer vision system 103 processes the image using the RNN 105 to iteratively construct respective polyline representations 803a-803e of the lane lines depicted in each image or frame. For example, as each frame of the video image is presented in the UI 801, the computer vision system 103 constructs the corresponding polylines 803a-803e from the starting point of each lane line in the frame progressing upwards in the frame in real-time or near-real time (e.g., 10 Hz, 30 Hz, etc.). In one embodiment, because the computer vision system 103 uses the RNN 105 to trace the contour of each detected lane lines by tracing the contour from one detected point of the contour line to the next, the computer vision system 103 can trace through potential occlusions of the object contours or lane lines in the input image. In the example of FIG. 8, the polyline 803d can be constructed by tracing through the occlusion 805 (e.g., a puddle obscuring the underlying lane line) to find a next point along the corresponding lane line. In this case, "tracing through" refers to the RNN 105 evaluating the glimpses along the polyline 803d from a point before the occlusion 805 to a point after the occlusion 805 that the RNN 105 predicts is a next coordinate along the detected lane line. Other common potential occlusions includes include cars or other vehicles in the input image that occlude a road feature or object of interest (e.g., a lane line).

Returning to FIG. 1, as shown, the system 100 includes the computer vision system 103 configured to detect lane lines according to the various embodiments described herein. In one embodiment, the computer vision system 103 includes or is otherwise associated with one or more machine learning networks (e.g., the CNN 107 for generating lane feature maps from input images, and the RNN 105 for traversing the feature map to iteratively and directly output lane line coordinates). In one embodiment, the computer vision system 103 includes sensors (e.g., camera sensors) and related components for automatically detecting features such as lane lines in image data to support localization of a vehicle 101 within a sensed environment. In one embodiment, at least one machine learning network of the computer vision system 103 is a traditional convolutional neural network (e.g., the CNN 107) which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above. In addition, the computer vision system 103 can also include a recurrent neural network in which connections between nodes or neurons of the network form a directed cycle to enable dynamic temporal behavior. In contrast to convolutional neural networks, recurrent neural networks have internal memories that can store sequential information or inputs to generate output features. It is contemplated that any type of recurrent neural network can be used with the embodiments described herein including, but not limited to: (1) recursive neural networks including tensor-based recursive neural networks that enable traversing of graph-like structures in topological order; (2) a fully recurrent network comprising neurons or nodes with a directed connection to each other neuron or node; etc.

In one embodiment, the computer vision system 103 also has connectivity or access to a geographic database 113 which stores representations of mapped geographic features to facilitate visual odometry to increase localization accuracy. The geographic database 113 can also store polyline representations, parametric representations of lane lines and other similar features and/or related data generated or used to detect lane lines using a cursor recurrent neural network according to the various embodiments described herein.

In one embodiment, the computer vision system 103 has connectivity over a communication network 115 to the services platform 109 that provides one or more services 111. By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the computer vision system 103 (e.g., lane line coordinates, polylines, lane attribute, lane features, etc.) to localize the vehicle 101 or a user equipment 117 (e.g., a portable navigation device, smartphone, portable computer, tablet, etc.) to provide services 111 such as navigation, mapping, other location-based services, etc.

In one embodiment, the computer vision system 103, the RNN 105, and/or the CNN 107 may be a platform with multiple interconnected components. The computer vision system 103 may include multiple servers, intelligent networking devices, computing devices, components and corresponding software for providing parametric representations of lane lines. In addition, it is noted that the computer vision system 103 may be a separate entity of the system 100, a part of the one or more services 111, a part of the services platform 109, or included within the UE 117 and/or vehicle 101.

In one embodiment, content providers 119a-119m (collectively referred to as content providers 119) may provide content or data (e.g., including geographic data, parametric representations of mapped features, etc.) to the geographic database 113, the computer vision system 103, the services platform 109, the services 111, the UE 117, the vehicle 101, and/or an application 121 executing on the UE 117. The content provided may be any type of content, such as map content, textual content, audio content, video content, image content, etc. In one embodiment, the content providers 119 may provide content that may aid in the detecting and classifying of lane lines and/or other features in image data, and estimating the quality of the detected features. In one embodiment, the content providers 119 may also store content associated with the geographic database 113, computer vision system 103, services platform 109, services 111, UE 117, and/or vehicle 101. In another embodiment, the content providers 119 may manage access to a central repository of data, and offer a consistent, standard interface to data, such as a repository of the geographic database 113.

In one embodiment, the UE 117 and/or vehicle 101 may execute the software application 121 to detect lane lines in image data using a cursor recurrent neural network or equivalent according the embodiments described herein. By way of example, the application 121 may also be any type of application that is executable on the UE 117 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the computer vision system 103 and perform one or more functions associated with detecting lane lines using a cursor recurrent neural network alone or in combination with the computer vision system 103.

By way of example, the UE 117 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 117 can support any type of interface to the user (such as "wearable" circuitry, etc.). In one embodiment, the UE 117 may be associated with the vehicle 101 or be a component part of the vehicle 101.

In one embodiment, the UE 117 and/or vehicle 101 are configured with various sensors for generating or collecting environmental image data (e.g., for the computer vision system 103), related geographic data, etc. In one embodiment, the sensed data represent sensor data associated with a geographic location or coordinates at which the sensor data was collected. By way of example, the sensors may include a global positioning sensor for gathering location data (e.g., GPS), IMUS, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 117 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the UE 117 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 117 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the computer vision system 103, services platform 109, services 111, UE 117, vehicle 101, and/or content providers 119 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
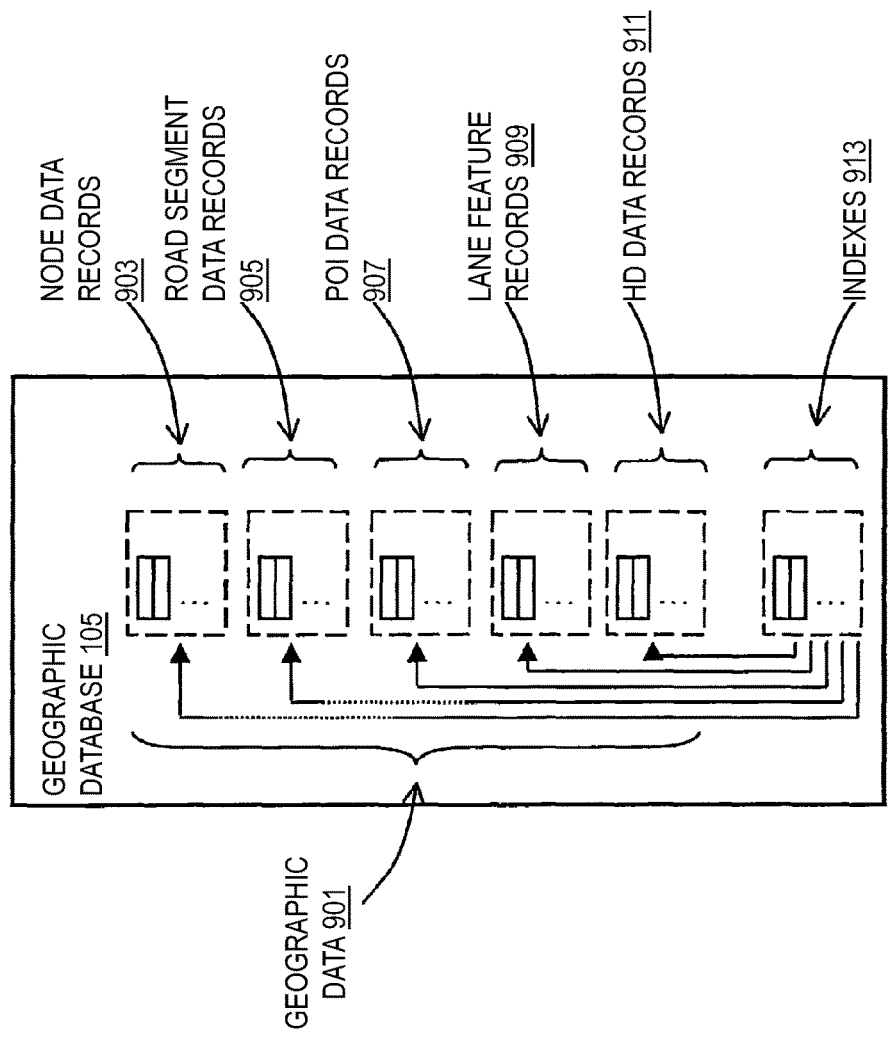
FIG. 9 is a diagram of a geographic database, according to one embodiment.

FIG. 9 is a diagram of a geographic database, according to one embodiment. In one embodiment, the geographic database 113 includes geographic data 901 used for (or configured to be compiled to be used for) mapping and/or navigation-related services, such as for visual odometry based on detected lane lines. In one embodiment, the geographic database 113 include high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 903, road segment or link data records 905, POI data records 907, lane feature records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 113. In one embodiment, the indexes 913 may be used to quickly locate data without having to search every row in the geographic database 113 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 907. The geographic database 113 can also include data about places, such as cities, towns, or other communities, and other geographic features, such as bodies of water, mountain ranges, etc. Such place or feature data can be part of the POI data records 307 or can be associated with POIs or POI data records 907 (such as a data point used for displaying or representing a position of a city).

In one embodiment, the geographic database 113 can also include lane feature records 909 for storing the lane lines (e.g., polyline or parametric representations of lane lines) detected from input image data according to the various embodiments described herein. In one embodiment, the geographic database 113 can also store the confidence values and the estimated quality of the detected lane features. By way of example, the lane feature records 909 can be associated with one or more of the node records 903, road segment records 905, and/or POI data records 907 to support localization or visual odometry based on the features stored therein and the corresponding estimated quality of the features. In this way, the parametric representation records 909 can also be associated with the characteristics or metadata of the corresponding record 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 113 can be maintained by the content provider 119 in association with the services platform 109 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 117) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing lane line detection using a cursor recurrent neural network may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
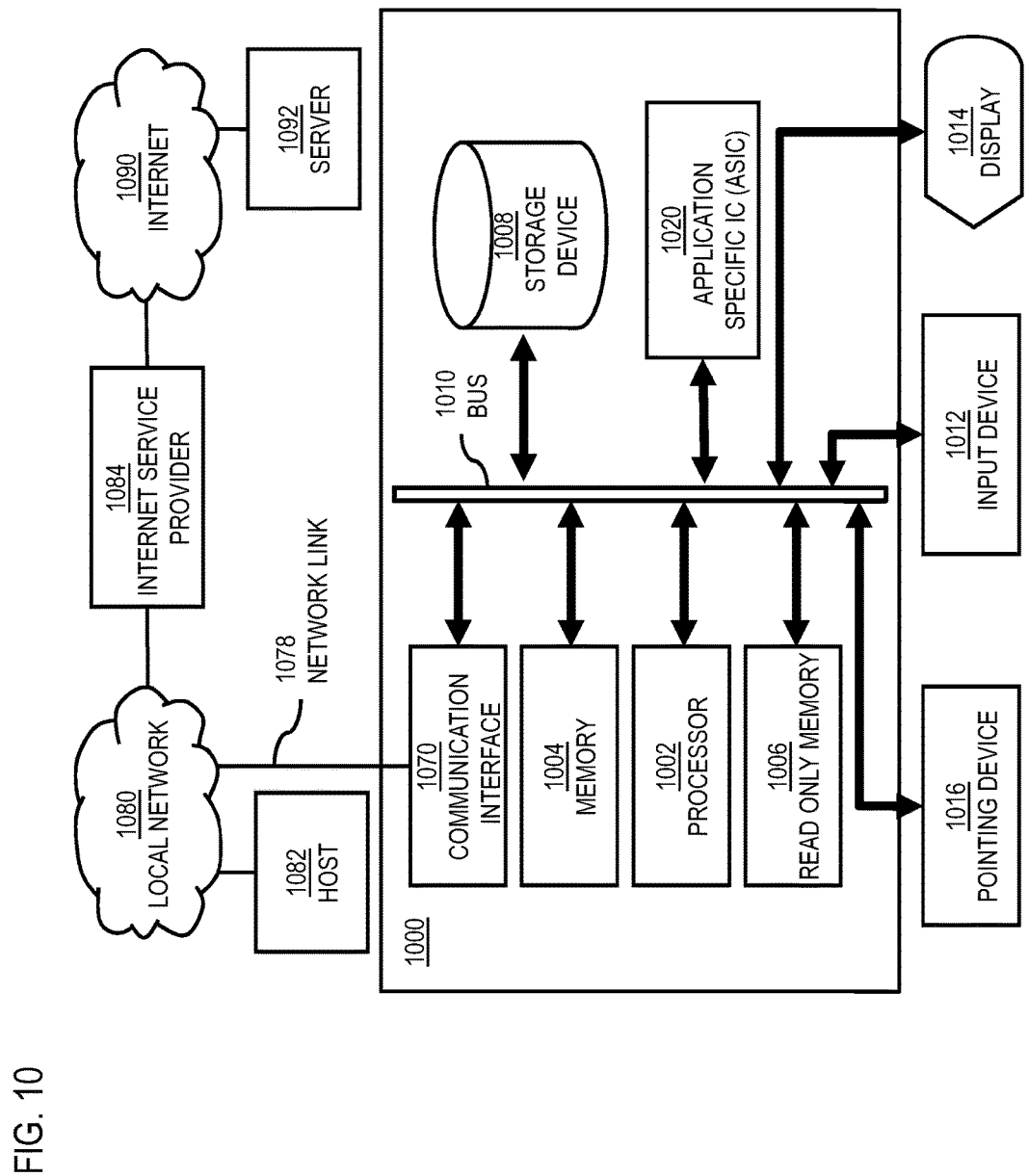
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide lane line detection using a cursor recurrent neural network as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing lane line detection using a cursor recurrent neural network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing lane line detection using a cursor recurrent neural network. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing lane line detection using a cursor recurrent neural network, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 115 for providing lane line detection using a cursor recurrent neural network.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide lane line detection using a cursor recurrent neural network as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide lane line detection using a cursor recurrent neural network. The memory 1105 also stores the data associated with or generated by the execution of the inventive steps.

Figure 12:
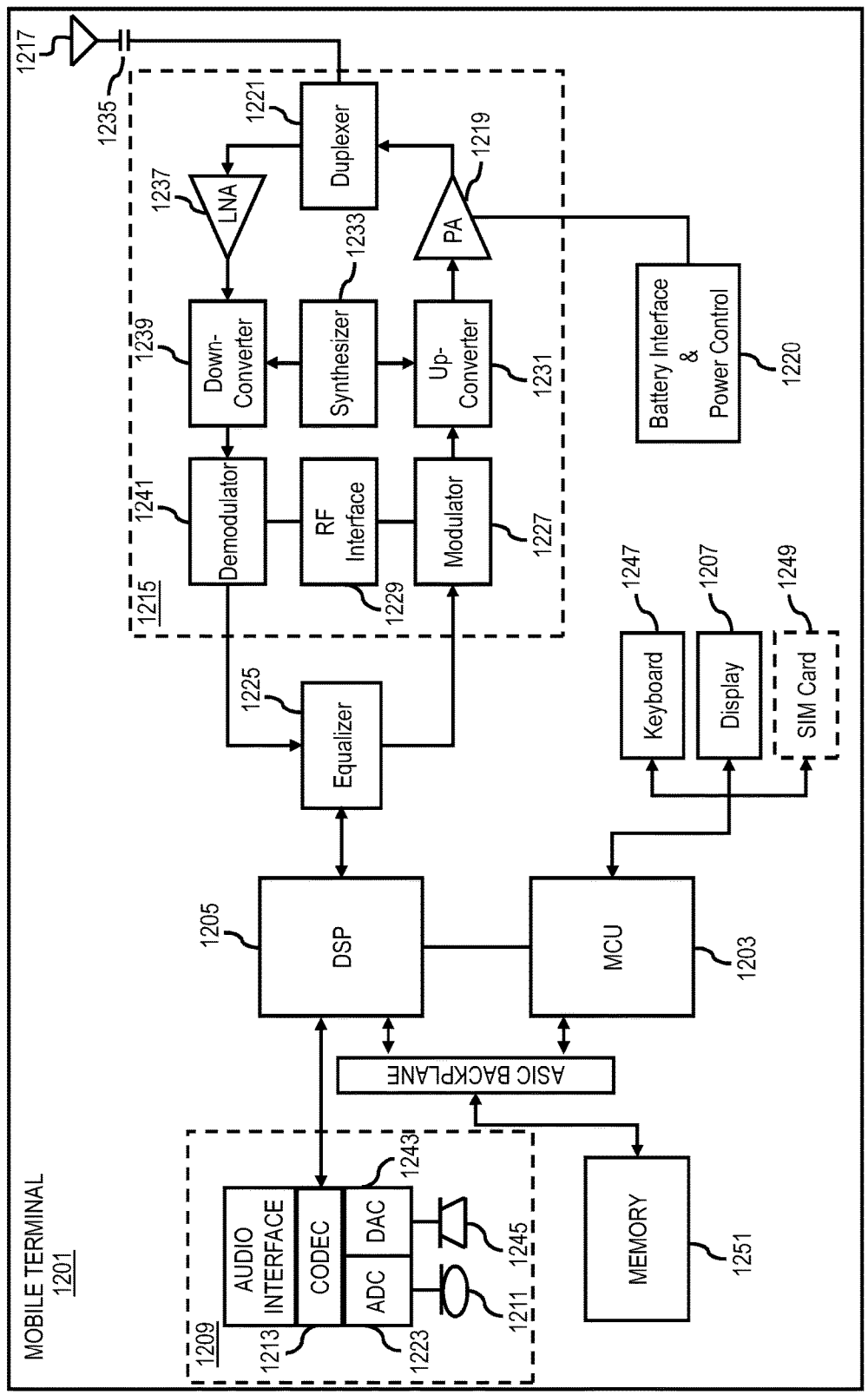
FIG. 12 is a diagram of a mobile terminal (e.g., handset) that can be used to implement an embodiment of the invention.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide lane line detection using a cursor recurrent neural network. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for detecting one or more object contours in an image comprising:
    receiving a feature map, wherein the feature map encodes high level features of the one or more object contours detected in the image with respect to a plurality of grid cells, and further encodes respective start locations of each of the one or more object contours with respect to the plurality of grid cells;
    selecting a grid cell from among the plurality of grid cells including at least one of the respective start locations of at least one of the one or more object contours;
    determining a location of the at least one start location within the selected grid cell;
    determining a set of feature values from a subset of the plurality of grid cells of the feature map within a proximity threshold of the selected grid cell;
    processing the location and the set of feature values using a machine learning network to output a displacement vector to indicate a next coordinate of the at least one object contour; and
    updating a cursor of the machine learning network based on the displacement vector.

2. The method of claim 1, wherein the feature map is generated by a convolutional neural network.

3. The method of claim 1, wherein the high level features of the one or more object contours include a location of the one or more object contours, a slope of the one or more object contours, a characteristic of the one or more object contours, or a combination thereof.

4. The method of claim 1, wherein the machine learning network is a recurrent neural network, the method further comprising:
    instantiating the recurrent neural network at the at least one start location within the selected grid cell to output the displacement vector to indicate the next coordinate.

5. The method of claim 4, wherein the recurrent neural network is instantiated at the next coordinate to continue to iteratively determine another next coordinate in the at least one object contour.

6. The method of claim 1, further comprising:
    processing the location and the set of feature values to output state information regarding the at least one object contour.

7. The method of claim 6, wherein the state information includes a contour line start, a contour line stop, a type of contour line, or a combination thereof.

8. The method of claim 1, further comprising:
    using the machine learning network to iteratively generate another displacement vector based on the next coordinate and another set of feature values corresponding to the next coordinate to indicate another next coordinate of the least one object contour until an end of the at least one object contour is reached.

9. The method of claim 8, wherein the feature map includes one or more intermediate layers including respective grid cells at different respective scales, and wherein the set of feature values also includes the one or more intermediate layers at the different respective scales.

10. The method of claim 9, further comprising:
    processing the set of feature values at a first one of the one or more intermediate layers corresponding to a coarser one of the different respective scales to determine a general direction or a general location of the next coordinate; and
    processing the set of feature values at a second one of the one or more intermediate layers corresponding to a finer one of the different respective scales to determine the displacement vector or the next coordinate exactly.

11. An apparatus for detecting one or more lane lines in an image comprising:
    at least one processor; and
    at least one memory including computer program code for one or more programs,
    the at least one memory and the computer program code configured to, within the at least one processor, cause the apparatus to perform at least the following,
        receive a feature map, wherein the feature map encodes high level features of the one or more lane lines detected in the image with respect to a plurality of grid cells, and further encodes respective start locations of each of the one or more lane lines with respect to the plurality of grid cells;
        select a grid cell from among the plurality of grid cells including at least one of the respective start locations of at least one of the one or more lane lines;
        determine a location of the at least one start location within the selected grid cell;
        determine a set of feature values from a subset of the plurality of grid cells of the feature map within a proximity threshold of the selected grid cell;
        process the location and the set of feature values using a machine learning network to output a displacement vector to indicate a next coordinate of the at least one lane line; and
        update a cursor of the machine learning network based on the displacement vector.

12. The apparatus of claim 11, wherein the machine learning network is a recurrent neural network, and wherein the apparatus is further caused to:
    instantiate the recurrent neural network at the at least one start location within the selected grid cell to output the displacement vector to indicate the next coordinate,
    wherein the recurrent neural network is instantiated at the next coordinate to continue to iteratively determine another next coordinate in the at least one lane line.

13. The apparatus of claim 11, wherein the apparatus is further caused to:
    process the location and the set of feature values to output state information regarding the at least one lane line, wherein the state information includes a line start, a line stop, a type of line, or a combination thereof.

14. The apparatus of claim 11, wherein the feature map is generated by a convolutional neural network, and wherein the feature map includes one or more intermediate layers including respective grid cells at different respective scales, and wherein the set of feature values also includes the one or more intermediate layers at the different respective scales.

15. The apparatus of claim 14, wherein the apparatus is further caused to:
  process the set of feature values at a first one of the one or more intermediate layers corresponding to a coarser one of the different respective scales to determine a general direction or a general location of the next coordinate; and
  process the set of feature values at a second one of the one or more intermediate layers corresponding to a finer one of the different respective scales to determine the displacement vector or the next coordinate exactly.

16. A non-transitory computer-readable storage medium for detecting one or more object contours in an image, carrying one or more sequences of one or more instructions which, when executed by one or more processors, cause an apparatus to perform:
  receiving a feature map, wherein the feature map encodes high level features of the one or more object contours detected in the image with respect to a plurality of grid cells, and further encodes respective start locations of each of the one or more object contours with respect to the plurality of grid cells;
  selecting a grid cell from among the plurality of grid cells including at least one of the respective start locations of at least one of the one or more object contours;
  determining a location of the at least one start location within the selected grid cell;
  determining a set of feature values from a subset of the plurality of grid cells of the feature map within a proximity threshold of the selected grid cell;
  processing the location and the set of feature values using a machine learning network to output a displacement vector to indicate a next coordinate of the at least one object contour; and
  updating a cursor of the machine learning network based on the displacement vector.

17. The non-transitory computer-readable storage medium of claim 16, wherein the machine learning network is a recurrent neural network, and wherein the apparatus is caused to further perform:
  instantiating the recurrent neural network at the at least one start location within the selected grid cell to output the displacement vector to indicate the next coordinate, wherein the recurrent neural network is instantiated at the next coordinate to continue to iteratively determine another next coordinate in the at least one lane line.

18. The non-transitory computer-readable storage medium of claim 16, wherein the apparatus is caused to further perform:
  processing the location and the set of feature values to output state information regarding the at least one object contour,
  wherein the state information includes a contour line start, a contour line stop, a type of contour line, or a combination thereof.

19. The non-transitory computer-readable storage medium of claim 16, wherein the feature map is generated by a convolutional neural network, and wherein the feature map includes one or more intermediate layers including respective grid cells at different respective scales, and wherein the set of feature values also includes the one or more intermediate layers at the different respective scales.

20. The non-transitory computer-readable storage medium of claim 19, wherein the apparatus is caused to further perform:
  processing the set of feature values at a first one of the one or more intermediate layers corresponding to a coarser one of the different respective scales to determine a general direction or a general location of the next coordinate; and
  processing the set of feature values at a second one of the one or more intermediate layers corresponding to a finer one of the different respective scales to determine the displacement vector or the next coordinate exactly.

* * * * *